July 1, 1930.  W. K. HOWE  1,769,693

BRAKE SHOE FOR CAR RETARDERS

Filed Oct. 6, 1926  2 Sheets-Sheet 1

July 1, 1930.    W. K. HOWE    1,769,693
BRAKE SHOE FOR CAR RETARDERS
Filed Oct. 6, 1926    2 Sheets-Sheet 2
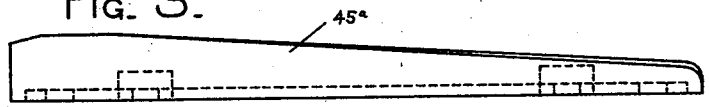
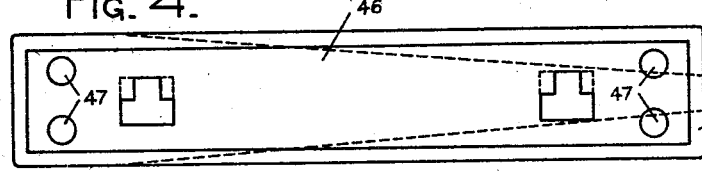
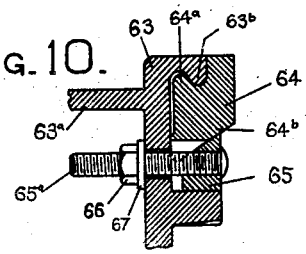
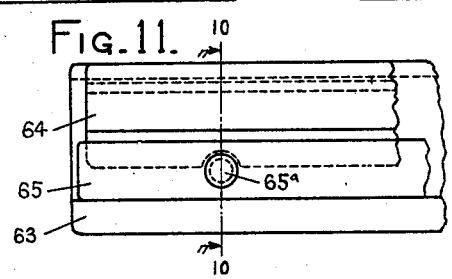
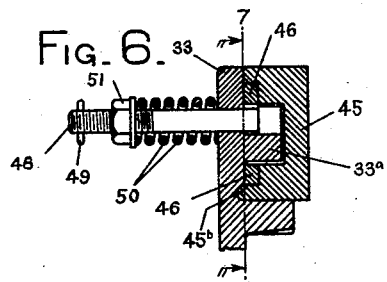
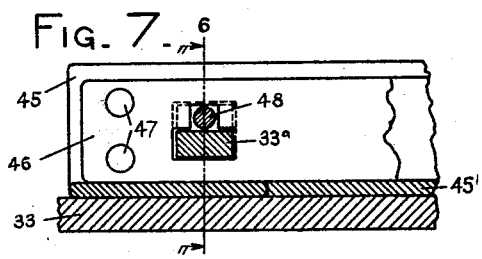
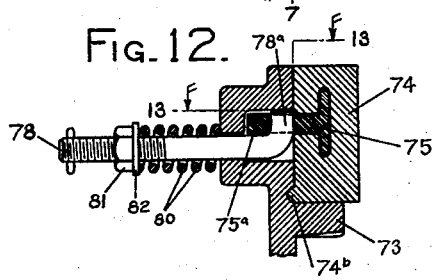
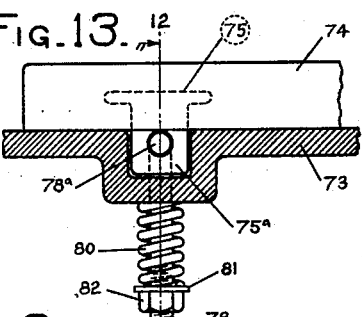
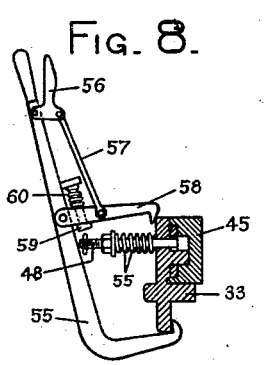
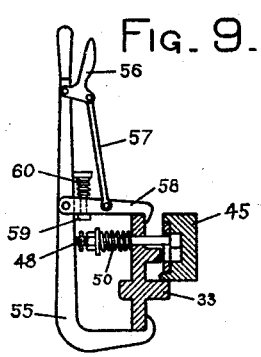

Patented July 1, 1930

1,769,693

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

BRAKE SHOE FOR CAR RETARDERS

Application filed October 6, 1926. Serial No. 139,869.

This invention relates to braking apparatus located along a railway track for retarding cars as they pass thereby, generally known as car retarders or track brakes, and more particularly to the brake shoes thereof and that portion of the track brake which facilitates quick and ready replacement of such brake shoes.

The brake shoes of car retarders of the track brake type, which are located along the track, if cars are rapidly passing thereby, are almost in constant use and are exposed to severe wear and require frequent replacement. In view of this fact and other considerations, it is proposed in accordance with the present invention to construct the shoe beams on which the brake shoes are mounted, and these brake shoes, so as to constitute counter part structures of quick detachable inter-engaging means, whereby the brake shoes may be readily removed for replacement, and the like. In several forms of the present invention it is proposed to include in this quick detachable inter-engaging means springs which serve to lock its brake shoes in their locked position against the shoe beam, the relation of the parts being such that the strain exerted upon the brake shoe by a passing car is such as will not actuate this spring locking means.

As a further object of the present invention it is proposed to shape the end shoes of the car retarders in such a way that the end shoes are separated without undue strain on the car retarder mechanism as car wheels enter the same.

As a still further object of the present invention it is proposed to provide a tool or lever mechanism whereby the spring locks heretofore mentioned may be readily unlocked by the compression of the springs thereof.

Other objects, purposes and characteristic features of the invention will be obvious from the drawings and will be apparent as the description progresses.

In describing the invention in detail reference will be made to the accompanying drawings in which:—

Fig. 3 is a plan view of one of the end brake shoes of the car retarder shown in Fig. 1;

Fig. 4 is a side elevation of the brake shoe shown in Fig. 3;

Fig. 5 is an end view of the brake shoe shown in Fig. 4;

Fig. 6 is a cross-sectional view of the shoe beam and brake shoe of one form of the present invention illustrating the quick detachable inter-engaging spring locking means and taken on the line 6—6 of Fig. 7;

Fig. 7 is a section taken on the line 7—7 of Fig. 6;

Fig. 8 shows the tool or lever mechanism for unlatching the spring locking means for anchoring the brake shoe, showing the lever before the spring is compressed;

Fig. 9 shows the tool mechanism shown in Fig. 8, but illustrating it in its active and applied position;

Fig. 10 is a cross-sectional view of a modified form of shoe beam and a modified form of brake shoe applied thereto;

Fig. 11 shows a side elevation of the shoe beam and a brake shoe shown in Fig. 10.

Fig. 12 is a cross-sectional view taken on the line 12—12 of Fig. 13 illustrating another modified form of the invention employing a spring lock; and, Fig. 13 illustrates a section taken on the line 13—13 of Fig. 12.

Figure 2:
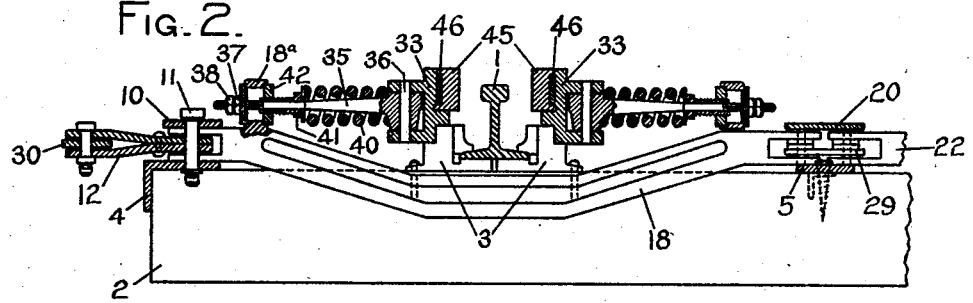
Fig. 2 is a sectional elevation taken on the line 2—2 of Fig. 1.

Referring to the drawings, a portion of a railway track comprising a rail 1 secured to ties 2 through the medium of guide blocks 3, more particularly shown in Fig. 2 has been illustrated. The various ties 2 are fastened together by an angle bar 4 extending along one end of the ties, and a bar of strap iron 5 extending along an intermediate point of the ties, these bars or straps being fastened to the ties by lag screws 7, as shown. Parallel to the angle bar 4 and spaced a suitable distance above the same, is a bearing piece 10 which, in connection with the angle bar 4, forms journals for pins 11 of the various double angle levers 12, these angle levers being pivotally supported on the pins 11 and through the medium of pins 13 and 14 are adapted to move the girder beams 17 and 18 in opposite directions as the double angle levers are moved in a certain direction. These girder beams 17 and 18 are of identical construction, and each include an upper and sidewardly projecting apertured lug 17$^a$ and 18$^a$ and in the construction illustrated, are arranged so that these lugs are on opposite ends of the parallelly arranged girders 17 and 18. Referring to Fig. 2, the right hand ends of the girder beams 17 and 18 rest on the strap 5 and are held against transverse movement by a U-shaped girder beam guide 20. This girder beam guide is of such width that it may accommodate the free ends of girder beams 21 and 22 which extend underneath the other rail (not shown) of the trackway, the opposite ends of the girder beams 21 and 22 being supported in a girder beam guide similar to the one shown. It should be noted that the left hand ends of girder beams 21 and 22 are spaced apart in the girder beam guide and that the girder beams 17 and 18 are operatively connected to the girder beams 21 and 22 by links 28 and 29, respectively.

From the construction thus far described, it appears that if the double angle lever 12 (see Fig. 1) is moved upwardly, that the lug 17$^a$ moves toward the left and the lug 18$^a$ moves toward the right; in other words, the lugs projecting from adjacent girder beams move toward each other as the double angle lever is moved to a higher braking position. Since the various groups of angle levers and associated mechanisms are the same, they may be assigned like reference characters having distinctive exponents. The various double angle levers 12 are connected together by a main operating beam 30. Referring to Fig. 2 it will be noted that the guide blocks 3 on opposite sides of the rail 1 are of identical construction and that they provide anchoring means for anchoring the rail and provide hook-shaped slots (not shown, see case above referred to) in which the hook (not shown, but shown in my prior application above mentioned) projecting from the shoe beam 33 is adapted to slide, thus forming a slidable engagement between the shoe beams 33 and the guide blocks 3, and thus permitting independent lateral movement of the shoe beams 33, but not permitting rolling movement of these shoe beams 33. In this connection an adjoining pair of these blocks 3 may be cast integral, if desired, in which event they will be passed over the end of the rail during assembling.

It should be noted that one shoe beam 33 is provided for every two double angle levers 12 and that one end of these shoe beams is provided with a vertically disposed slot into which the adjoining end of another shoe beam, having a projecting tongue which snugly fits this slot, is adapted to engage; in other words, each shoe beam has a vertical slot on one end and a vertically disposed tongue on the other, and the tongue of each shoe beam engages the slot of its adjoining shoe beam. This articulates the connection between adjacent shoe beams thus affording what may be said to be a continuous flexible braking surface. Referring to Fig. 2, it will be noted that a spring guide 35 is connected pivotally by a pin 36 between flanges projecting from the shoe beam 33 and that the free end of this spring guide 35 extends through the perforation of a lug projecting from one of the girder beams, such, for instance, as the lug 18$^a$ projecting from the girder beam 18 shown in Fig. 2. This spring guide 35 is threaded at its free end and carries a nut 37 and a lock nut 38 whereby the spacing between the shoe beams for any particular retarder position may be determined. On this spring guide 35 is carried an initially tensioned coil spring 40, the initial tension of which may be adjusted by the initial tension variable spacer comprising the threaded bushing 41 and the nut 42 threaded thereon. It readily appears that the maximum or initial tension to which the spring 40 is compressed is determined by this spacing bushing 41 and nut 42 after the nuts 37 and 38 once have been adjusted; so that not only can the spacing between the brake shoe beams 33 be fixed, but the initial or minimum tension of the spring 40 may be adjusted to any desired value.

It should be noted that there are two types of brake shoes namely, those used in the main part of the car retarder which have their fronts and backs substantially parallel conveniently called intermediate brake shoes, and those used at the entering and leaving end of the retarders conveniently called the entering or tapered brake shoes. Since the anchoring means for both of these types of shoes are the same the shoes shown in Figs. 6, 7, 10, 11, 12 and 13 apply to either end shoes or intermediate shoes, these end shoes for the preferred form of the present invention being shown in detail in Figs. 3 to 5 and the anchoring means for this preferred form of brake shoe and attaching means being shown in Figs. 6 and 7.

As already stated and as is obvious to those skilled in the art of braking, an appreciable amount of wear on the brake shoes is experienced in consequence of which it is necessary to replace such brake shoes from time to time, and for this reason the intermediate brake shoes 45 (see Figs. 1, 2, 6, 7, 10, 11, 12 and 13) and the entering or end brake shoes 45$^a$ (see Figs. 3, 4 and 5) are detachably secured to the brake shoe beams 33. In the preferred construction shown, referring to Figs. 2, 3, 4, 5, 6 and 7, the brake shoes 45 and 45ᵃ are provided with a steel insert 46, which steel insert constitutes a steel plate having perforations therein. This insert is placed in the mold and cast integral with the brake shoes 45 or 45ᵃ, the cast metal employed being of a composition generally used in cast brake shoes for freight cars, which cast metal has all the desired characteristics such as toughness, flexibility and a high coefficient of friction when engaged by car wheels of the usual construction. In order to effect a substantial connection between the brake shoes 45, or 45ᵃ, and a steel insert 46, this insert 46 is perforated as shown at 47, so that molten metal will flow into these perforations and upon cooling and contracting, this cast metal will firmly grip the insert so as to make the casting and insert substantially a unitary structure.

Figure 1:
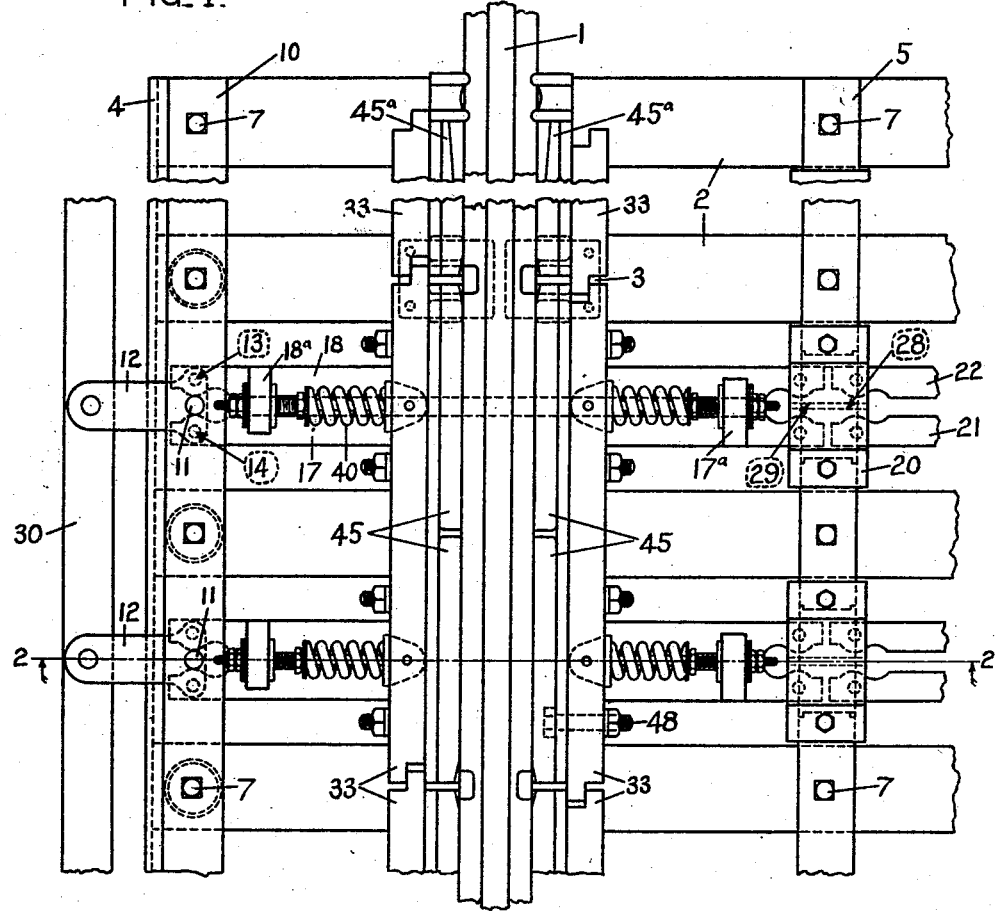
Fig. 1 shows a plan view of a portion of a car retarder of the track brake type more completely shown in the prior application, Ser. No. 70,599, filed November 21, 1925 to which reference may be had:—

By looking at Fig. 1 it will be noted that the brake shoes 45 are arranged end to end in a manner so that endwise movement of a single shoe is permitted only to a very slight extent and that very little clearance between these shoe beams 33 and the rail 1 is present. This limitation of movement of a brake shoe, even though detachable, makes special securing means necessary to hold the shoe in position; such securing means preferably being so constructed as to facilitate the removal of any one of the brake shoes separately and without removing adjoining brake shoes.

In the particular embodiment of the invention illustrated (see Figs. 6 and 7) this special securing means, or quick detachable inter-engaging means comprises an inverted T-shaped opening near each end in the insert 46 of each brake shoe 45 or 45ᵃ, which opening is arranged over a pocket in the brake shoe casting, and permits the entry of the T-shaped head of the bolt 48, this bolt having a pin 49 therein for indicating the turned position of the T-shaped head thereof. After the T-shaped head of the bolt 48 has entered the enlarged portion of the T-shaped opening in the insert 46, the whole brake shoe may be moved downward thereby causing the T-shaped head to pass back of the narrow portion of this opening, after which the brake shoe may be moved toward the shoe beam 33 and in so doing cause the lug 33ᵃ to enter the enlarged portion of this opening, thereby preventing the brake shoe from being moved transversely of the bolt 48. It should be noted that the lower edge of the brake shoe 45 is provided with an extending lip 45ᵇ, and that this lip engages a groove or recess in the shoe beam 33 so as to prevent lifting of the brake shoe due to frictional engagement of such brake shoe with the rear part of a forwardly moving car wheel.

On the bolt 48 is an initially tensioned compression spring 50, the tension of which is adjustable by the nut 51 contained on the bolt 48. It readily appears that the brake shoe 45 may be quickly removed if both of the bolts 48 forming part of the locking means for locking a single shoe to the shoe beam are pushed inwardly by compressing the springs 50, and that if these bolts are moved to an extent to allow the insert 46 to be moved upwardly past the end of the projecting lug 33, the T-shaped heads of these bolts 48 may pass through that portion of the opening in the insert 46 which formerly contained the lug 33ᵃ, and that if these T-shaped heads of bolts 48 are now passed through the enlarged portions of the openings in the brake shoe the brake shoe is free to be entirely removed.

In order to further facilitate the removal of brake shoes secured by spring locking means, such as just described and shown in Figs. 6 and 7, a tool or lever mechanism such as shown in Figs. 8 and 9 has been provided for compressing the springs 50 to the necessary extent and maintaining them compressed so long as desired. Since there are two spring locks for each brake shoe, at least two of these levers are preferably used when brake shoes are to be replaced. This lever mechanism comprises a lever of the usual construction, consisting of a main bar 55, having its lower end rounded and forming a hook which may engage the lower projecting flange of the shoe beam 33. This bar 55 has a hand trigger 56 of the usual construction pivotally fastened near the upper end thereof, which hand trigger through the connecting rod 57 operates a hook-shaped latch 58 pivoted near the lower end of the lever bar 55 and having its movement limited by a stop 59, said latch being urged into its latching position by a compression spring 60. In the employment of this lever mechanism the lower hook-shaped end is hooked under the shoe beam 33 in a position so that the main lever bar 55 engages the end of the bolt 48, (see Fig. 8) so that the bolt 48 may be pushed inwardly and after having been moved to a sufficient extent the latch 58 may engage the upstanding flange of the shoe beam 33 directly over the bolt 48, the lever mechanism in this latter position having been shown in Fig. 9 of the drawings. If desired two of these levers may be fastened together so as to constitute one lever mechanism wherein the levers are so spaced that the two bolts and the springs contained thereon of a single brake shoe may be depressed simultaneously.

In Figs. 10 and 11 has been shown a modified arrangement wherein a brake shoe is employed which does not require a steel insert nor a localized anchoring or locking means for securing the brake shoe to the shoe beam. In this modification the shoe beam 63, of the usual construction having a reinforcing and shielding web 63ª projecting therefrom, has its upper end shaped to form a hook 63ᵇ under which the projecting lip 64ª of the brake shoe 64 may engage. This brake shoe 64 when in its engaged position with the hook 63ᵇ is held in this position by the wedge 65 pressed against the lower tapered edge 64ᵇ of the brake shoe. This wedge 65 is drawn into the locked position, as shown, by the bolt 65ª having a nut 66 and a washer 67. It will be noted that in this form of the invention the hook 63ᵇ is continuous as is also the projecting lip 64ª, so that the top portion of the brake shoe 64 is very well anchored; and it will also be noted that the lower portion of the brake shoe is firmly anchored throughout its entire length by the wedge 65 secured by bolts 65ª. The lower edge of the brake shoe 64 is at points partly cut away to provide clearance for the bolts 65ª, so that with these bolts 65ª in position no endwise movement of the brake shoe 64 with respect to the shoe beam 63 is possible, this alone, however, is not relied upon to prevent endwise movement since the clamping means heretofore mentioned bears against the brake shoe and resists such endwise movement, the provision of the cutaway portion however causes proper registration of the brake shoe 64 with the shoe beam 63 when this brake shoe is being applied.

In Figs. 12 and 13 have been shown views of still another modified form of brake shoe and anchoring means, wherein the brake shoe 74 has a steel insert 75 therein which insert projects from the cast metal portion of the brake shoe 74, so as to form a projecting perforated lug 75ª. This lug 75ª when the brake shoe is in position projects into a cavity formed in the shoe beam 73, a hole being drilled into the wall surrounding this cavity through which extends the bolt 78 having its end turned up to form a hook 78ª. The hook-shaped bolt 78 is adapted to engage the perforated lug 75ª of the brake shoe 74. The bolt 78 also contains an initially tensioned compression spring 80 which has its tension adjustably maintained by a nut 81 bearing on a washer 82, so that the hook of the bolt 78 pulls the perforated lug 75ª into the cavity contained in shoe beam 73 and holds the brake shoe 74 in position against the shoe beam 73. It should be noted that the lower portion of the brake shoe 74 is provided with an extending flange or lip 74ᵇ which engages a groove extending along the shoe beam 73. This construction prevents undue strain on the projecting perforated lug 75ª. In this construction the brake shoe 74 may be readily removed by pushing in both of the bolts 78 against the compression force of springs 80, to an extent to permit the perforated lug 75ª to be lifted up and off of the hook-shaped ends of the bolts 78. The same lever mechanism as shown in Figs. 7 and 8, and heretofore described, may be employed in replacing brake shoes of the construction illustrated in Figs. 12 and 13, this replacing of brake shoes being carried out in a manner as already described in connection with the form of the invention shown in Figs. 6 and 7.

A brake shoe particularly constructed and arranged for use at the entering and leaving end of a car retarder, without placing undue strain on the car retarder mechanism as well as the wheel flanges of entering cars, has been provided as shown in Figs. 3, 4 and 5, as well as suitable quick detachable means for readily replacing such end brake shoes. These end or entering brake shoes are of symmetrical construction, so that the same shoe can be interchangeably used on either side of a track rail at opposite ends of the retarder. These end brake shoes have the surfaces facing to the rail tapered to permit ready entrance of a car wheel.

In each of the quick detachable counter part shoe beams and brake shoes illustrated, the brake shoes may be readily replaced one at a time, if such replacement is necessary, and this may be done quickly and without materially interfering with the classification of cars during periods when cars are being classified. This quick detachable feature whereby the brake shoes are secured in position makes it possible if a brake shoe is broken while cars are being classified to replace such brake shoe without disturbing adjacent shoes and in a very short time, and probably without at all interfering with such classification.

Having thus shown several modified forms of brake shoes and securing means embodying the present invention, having illustrated these forms rather specifically and having described them fully, this has been done for the purpose of clearly disclosing the invention and without the intent of being limited to these precise constructions, and it is desired to be understood that various changes and modifications may be made to adapt the invention to the particular problems encountered in practice without departing from the spirit or scope of the invention or the idea of means underlying the same.

What I claim as new is:—

1. In a car retarder, the combination with a shoe beam arranged parallel to a track rail and movable toward and away from such track rail having a shelf projecting inwardly from the lower edge thereof and having a flange projecting toward the rail from the upper edge thereof, said flange having a downwardly projecting lip, a brake shoe having its upper part shaped to constitute a counter part portion for said flange and lip and having its lower edge tapered, and a tapered block resting on said shelf and engaging the lower tapered edge of said brake shoe for holding said brake shoe in position against said shoe beam.

2. In a car retarder, the combination with a shoe beam arranged parallel to a track rail and movable toward and away from such track rail having a shelf projecting inwardly from the lower edge thereof and having a flange projecting toward the rail from the upper edge of said flange having a downwardly projecting lip, a brake shoe having its upper part shaped to constitute a counter part portion for said flange and lip and having its lower face tapered, a tapered block resting on said shelf and engaging the lower tapered edge of said brake shoe for holding said brake shoe in position against said shoe beam, and means for forcing said tapered block between said shelf and the lower face of said shoe.

3. In a car retarder, in combination, a shoe beam arranged adjacent a track rail and movable toward and away from such track rail, a brake shoe, co-operating counterpart portions carried partly on said shoe beam and partly on said brake shoe for preventing edgewise movement of said brake shoe with respect to said shoe beam, and means for maintaining said counterpart portions in cooperative relation.

4. In a car retarder, in combination, a shoe beam adjacent a track rail and movable toward and away from such rail, a brake shoe, cooperating interengaging members on the shoe and beam, and wedge means to hold the cooperating members in interengagement.

5. In a car retarder, in combination, a shoe beam adjacent a track rail and movable toward and away from such rail, a brake shoe, cooperating interengaging members on the shoe and beam, and screw carried, adjustable, wedge means to hold the cooperating members in interengagement and draw the shoe and beam together.

6. In a car retarder, in combination with a shoe beam arranged adjacent a track rail and movable toward and away from such track rail, a brake shoe, cooperating counterpart portions formed partly on said brake shoe and partly on said shoe beam for preventing up and down movement of said brake shoe with respect to said shoe beam and wedge means for preventing longitudinal movement of said brake shoe relatively to said shoe beam and maintaining said counter-part portions in cooperative relation.

In testimony whereof I affix my signature.

WINTHROP K. HOWE.